United States Patent
Verbowski

(10) Patent No.: US 10,882,169 B2
(45) Date of Patent: Jan. 5, 2021

(54) TOOL FOR TORSION BAR REPAIR

(71) Applicant: Larry Verbowski, Bay City, MI (US)

(72) Inventor: Larry Verbowski, Bay City, MI (US)

( * ) Notice: Subject to any disclaimer, the term of this patent is extended or adjusted under 35 U.S.C. 154(b) by 46 days.

(21) Appl. No.: 15/890,528

(22) Filed: Feb. 7, 2018

(65) Prior Publication Data

US 2018/0161970 A1 Jun. 14, 2018

Related U.S. Application Data

(62) Division of application No. 15/424,009, filed on Feb. 3, 2017, which is a division of application No. 12/366,280, filed on Feb. 5, 2009, now Pat. No. 9,597,778.

(51) Int. Cl.
*B25B 27/30* (2006.01)
*B25B 5/10* (2006.01)

(52) U.S. Cl.
CPC .............. *B25B 27/30* (2013.01); *B25B 5/101* (2013.01); *B60G 2206/93* (2013.01)

(58) Field of Classification Search
CPC .... B60G 2206/93; B60G 11/20; B60G 11/18; B25B 27/30; B25B 27/00; B25B 5/101; B25B 5/082; B25B 5/067; B25B 5/125; Y10T 29/53852
USPC ..................................... 280/124.166, 124.167
See application file for complete search history.

(56) References Cited

U.S. PATENT DOCUMENTS

| | | | | |
|---|---|---|---|---|
| 4,074,899 A | * | 2/1978 | Hochstetler | B25B 5/101 269/249 |
| 4,823,636 A | * | 4/1989 | Suska | B25B 5/101 24/514 |
| 5,626,263 A | * | 5/1997 | Lii | B05C 17/01 222/192 |
| 5,921,569 A | * | 7/1999 | Noutomi | B60G 11/20 267/277 |
| 2004/0212168 A1 | * | 10/2004 | Verbowski | B60G 11/20 280/124.167 |
| 2005/0046138 A1 | * | 3/2005 | Dagg | B60G 11/20 280/124.166 |
| 2008/0048371 A1 | * | 2/2008 | Dagg | B60G 11/183 267/273 |

OTHER PUBLICATIONS

OTC 7822A GM torsion Bar Unloading tool <https://www.amazon.com/OTC-7822A-torsion-Unloading-tool/dp/B0002SRGYI>.*

* cited by examiner

*Primary Examiner* — Lee D Wilson
*Assistant Examiner* — Seahee Hong

(57) ABSTRACT

A method and tool assembly (10) for unloading and reloading spring energy from a torsion bar (11) in a torsion bar suspension system of a motor vehicle. The tool assembly (10) includes a generally C-shaped body (14) having a screw shaft (24) threaded through a boss (22) in a lower section (18) thereof. An anti-rotation stem (38) includes a knurled flat face (40) which increases versatility of the tool assembly (10) by enabling anti-slip operation with various vehicle types. A counter-torque tool perch (46) extends from the lower section (18) of the tool body (14) for applying a counter-rotational torque to the body (14) during use of the tool assembly (10).

4 Claims, 5 Drawing Sheets

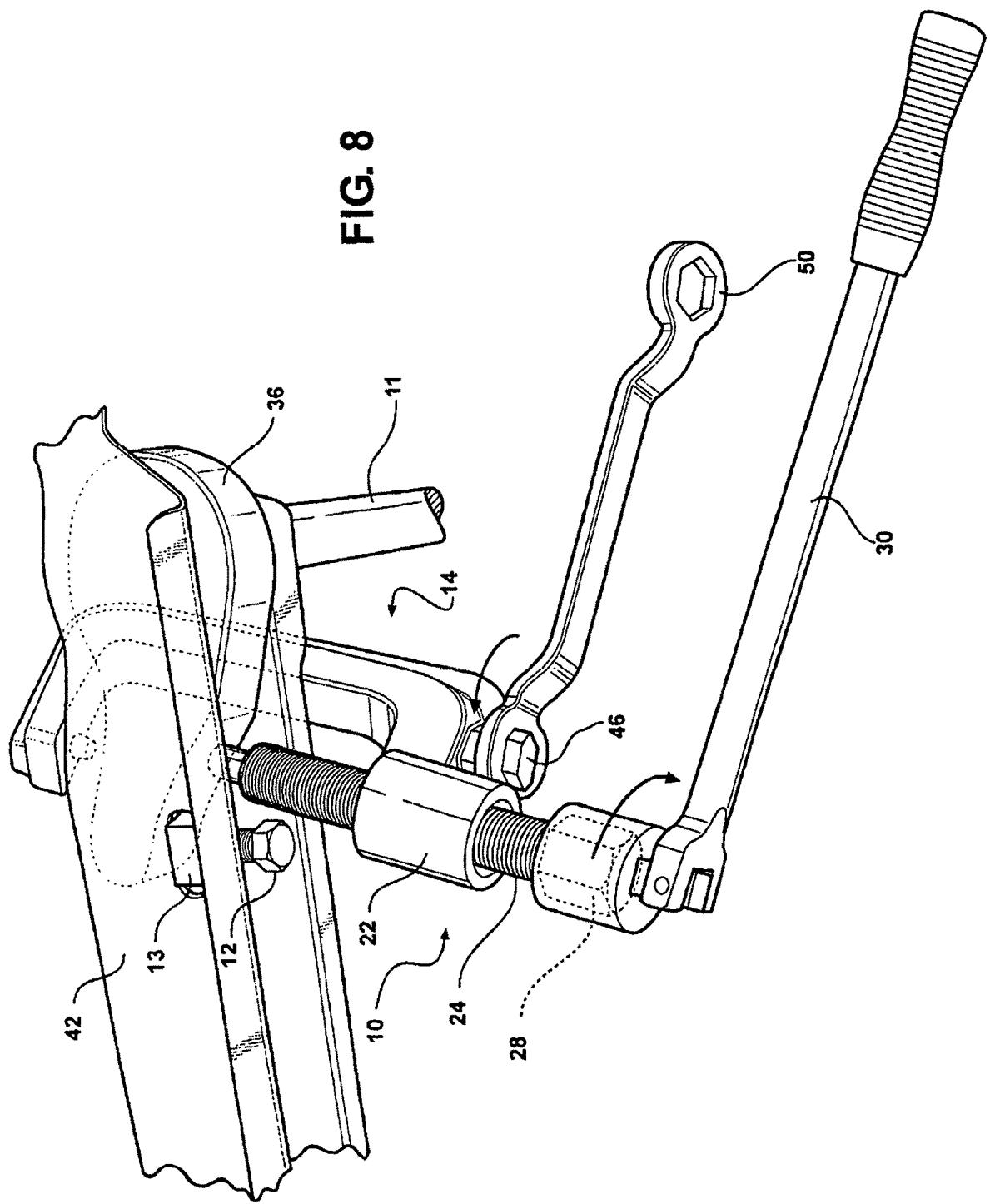

TOOL FOR TORSION BAR REPAIR

CROSS REFERENCE TO RELATED APPLICATIONS

This application is a divisional utility application from U.S. utility application Ser. No. 15/424,009 which is a divisional utility application from U.S. utility application Ser. No. 12/366,280, filed Feb. 5, 2009, which was filed from U.S. Provisional Patent Application No. 61/026,493 which was filed on Feb. 6, 2008, from which priority is claimed, the entire disclosures of which are hereby incorporated by reference and relied upon.

BACKGROUND OF THE INVENTION

Field of the Invention

This invention relates generally to a tool of the type used to service a torsion bar suspension system in a motor vehicle, and more particularly toward an unloading tool used to remove and restore spring energy in a torsion bar suspension system.

Related Art

Some motor vehicle suspensions use a torsion bar as a weight bearing spring. In this arrangement, one end of a long, usually metal torsion bar is attached firmly to the vehicle chassis and its opposite end is attached to an unsprung suspension component such as a suspension arm, spindle, axle or the like. Vertical motion of the vehicle wheel causes the torsion bar to twist which is resisted by the torsion bar's inherent spring resistance. The end of the torsion bar that is attached to the chassis is usually fitted with a crank-like or lever-like adjusting arm that is controlled by an adjusting bolt to accomplish height adjustments of the spring-weight portions of the vehicle. Over time, fatigue, wear and creep will necessitate periodic height adjustment of the torsion bar suspension system as part of routine vehicle maintenance. Likewise, a change in wheel size or the addition of a so-called "lift kit" may also necessitate adjustment of suspension height by manipulating the adjustment arm portion of the torsion bar suspension system. For this purpose, the adjusting bolt is fitted between the adjusting arm and a rigid hollow frame rail, in which the adjusting arm is stationed. Inside this hollow frame rail, the adjusting area remains relatively sheltered.

In order to service the torsion bar suspension system, which may include replacing the torsion bar or recalibrating the adjusting arm, it is usually necessary to relieve all of the stored spring energy in the torsion bar and also remove the adjusting bolt. Relieving the stored spring energy in a controlled manner can be a difficult and somewhat dangerous operation, as the torsion bar stores a tremendous amount of energy and the adjusting bolt is held in compression between the adjusting arm and the frame rail. Therefore, an unloading tool is required to temporarily transfer spring energy away from the adjusting bolt so that it can be removed or disabled before carefully releasing all of the torsion spring energy.

Current unloader tools have been proposed and are variously configured. One common type of unloader tool resembles a C-clamp which is placed over the frame rail and its screw shaft turned into engagement with the adjusting arm. By advancing the screw shaft far enough, spring energy is transferred from the adjusting bolt to the unloader tool. Once the adjusting screw has been disabled, the unloader tool can be manipulated to slowly release the stored spring energy. Other examples of prior art unloader tools may be configured differently, such as resembling a wheel or gear puller, but operate in the same general fashion.

A problem inherent with all of the prior art unloader tools resides in their tendency to slip out of position during operation. Due to the extremely large amounts of energy stored in a torsion spring, a slipping unloader tool can cause injury or damage when the stored energy is released in an uncontrolled manner. Some attempts have been made to address the slippage problem. For example, in many General Motors trucks equipped with torsion bar suspension, a small pilot hole is formed in the top of the frame rail, and a special unloader tool includes a small stem adapted to register in the pilot hole. When this style of unloader tool is hung over the rail, the stem on the unloader tool seats in the pilot hole in the frame rail, thus helping to keep it in position during the unloading process. However, this stem prevents the GM-style unloader tool from being used to work on suspension systems which are not equipped with a hole in the frame rail. Therefore, this type of prior art unloader tool is not at all versatile and therefore it is not attractive to service operators that repair various makes and styles of torsion suspension systems.

Furthermore, prior art unloader tools are susceptible to twisting out of position or into disadvantageous positions as the screw shaft is tightened against the adjusting arm or as attempts are made to carefully release the stored energy. As stated earlier, there is extremely large amounts of energy stored in the torsion spring, and therefore large amounts of force are required to displace the adjusting arm sufficiently far enough to disable and re-enable the adjusting bolt during the various phases of a service operation. This large force creates a high degree of friction at the point of contact between the tip of the screw shaft and the adjusting arm. This friction can cause the unloader tool to undesirably twist or shift out of position, increasing the chances for the tool slipping out of place and causing injury or damage. To counteract this undesirable twisting, a service operator may be tempted to use a free hand to hold the unloader tool in position. However, this increases the chances for injury. It is, in fact, not desirable for an operator's fingers to be placed on or near the unloader tool as a safety measure in the event the tool slips out of position. Again, because of the very large amounts of force and energy involved, substantial injury may result if the tool slips out of position while an operator's fingers are in close vicinity.

Accordingly, there is a need in this field to provide an unloading tool, and an improved method for safely unloading and reloading torsion spring systems, which is versatile among all motor vehicle makes and types, which is convenient to use, which is easy to manufacture and distribute, and which reduces the risk of injury to an operator.

SUMMARY OF THE INVENTION

This invention contemplates a tool assembly for unloading and reloading spring energy in a torsion bar suspension system for a motor vehicle. The tool assembly comprises a tool body having upper and lower sections. The body includes a threaded boss formed integrally with the lower section. A screw shaft is threadably engaged in the boss and extends between leading and trailing ends. The screw shaft includes an anvil at its leading end generally opposing the upper section of the body, and also a wrench receiving portion at the trailing end of the screw shaft. A counter-torque tool perch extends from the lower section of the body for applying a counter-rotational torque to the body during use of the tool assembly.

The counter-rotational tool perch feature of the subject invention is ideally suited to receive a wrench or other such tool so that a service operator working on a torsion bar suspension system can use the subject tool assembly in a manner that is safer than prior art systems. In other words, the counter-torque tool perch allows the operator to apply a counter-rotational torque to the body of the tool while the screw shaft is manipulated to service a torsion bar suspension system.

According to another aspect of this invention, a tool assembly is provided for removing and reinstating spring energy in a torsion bar suspension system of a motor vehicle. According to this aspect of the invention, the tool assembly comprises a tool body having upper and lower sections, with the body including a threaded boss at its lower section. A screw shaft is threadably engaged in the boss and extends between leading and trailing ends. The screw shaft includes an anvil at its leading end generally opposing the upper section of the body, and a wrench receiving portion at its trailing end. The body includes an anti-slip stem along its upper section. The anti-slip stem includes a knurled face configured to prevent slippage during use of the tool assembly. The anti-slip stem substantially enhances the versatility of the subject invention by enabling its use and applicability across a wide variety of motor vehicle types and makes. Thus, motor vehicles equipped with small pilot holes in a frame rail section adjacent an adjusting arm of the torsion suspension system will receive the anti-slip stem to prevent shifting of the tool out of position during use. However, motor vehicle types that do not include a pilot hole will benefit from the knurled face of the anti-slip stem which provides secure, biting engagement during use of the tool.

According to yet another aspect of this invention, a method is provided for removing an adjusting bolt from a torsion bar suspension system in a motor vehicle. The method comprises the steps of providing a torsion bar suspension system having a loaded torsion bar, an adjusting arm affixed to one end of the torsion bar and sheltered within a hollow frame rail. An adjusting member, typically in the form of a bolt, is operatively disposed between the adjusting arm and the frame rail. An unloader tool is provided having a body with upper and lower sections. A screw shaft of the unloader tool is threaded through its lower section. The method further includes the step of positioning the upper section of the tool body over the frame rail and locating the screw shaft of the unloader tool against the adjusting arm. Spring energy is transferred away from the adjusting member to the unloader tool by turning the screw shaft relative to the body so that the screw shaft pushes the adjusting arm away from the adjusting member. The method further includes the step of applying a counter torque to the body of the unloader tool simultaneously with the step of transferring spring energy away from the adjusting member to the unloader tool. Thus, the method of this invention represents an advancement in service safety by enabling a counter-torque to be applied to the body of the unloader tool at the same time the screw shaft is advanced against the adjusting arm. As a result, a service technician is better able to keep hands a safe distance from the unloading tool, as well as better control the tool and achieve swifter, more efficient results.

BRIEF DESCRIPTION OF THE DRAWINGS

These and other features and advantages of the present invention will become more readily appreciated when considered in connection with the following detailed description and appended drawings, wherein:

FIG. 8 is a perspective view showing the subject unloader tool disposed for service operation with auxiliary wrenches applied according to the preferred method of this invention.

DETAILED DESCRIPTION OF THE PREFERRED EMBODIMENT

Figure 7:
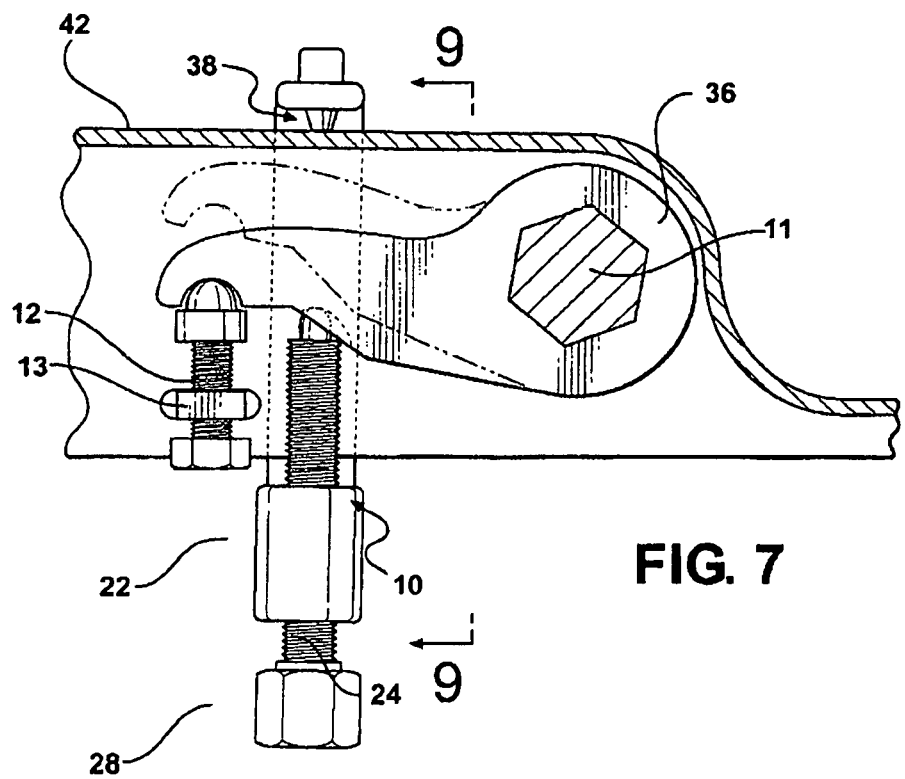
FIG. 7 is a simplified cross-sectional view showing a fragmentary portion of a frame rail in a motor vehicle together with an adjusting arm sheltered therein, an adjusting bolt, and the unloader tool of the subject invention poised for operation.

Referring to the Figures, wherein like numerals indicate like or corresponding parts throughout the several views, an unloader tool assembly according to the subject invention is generally shown at 10. The tool assembly 10 is of the type for removing an adjusting member in a torsion bar 11 suspension system for a motor vehicle. The adjusting member can be a cam, wedge, ratchet or other mechanical or electro-mechanical device, but in the most common applications comprises an adjusting bolt 12 as depicted in FIGS. 7 and 8. The adjusting bolt 12 is threaded through a cross-nut 13. The tool assembly 10 includes a tool body, generally indicated at 14, having an upper section 16, a lower section 18, and a riser section 20 interconnecting the upper 16 and lower 18 sections. In cross-section, each of the sections 16, 18, 20 are shown having a generally T-shaped configuration designed for maximum rigidity. Preferably, these sections 16-20 are arranged end-to-end into a generally C-shaped configuration similar in some respects to the ubiquitous C-clamp known from the woodworking and metalworking arts.

The lower section 18 of the tool body 14 includes an integral boss 22 having, in the preferred embodiment, a generally cylindrical appearance. The boss 22 is internally threaded along a longitudinally extending axis A which may be skewed slightly relative to the riser section 20. In the preferred example of this invention, the longitudinal axis A is canted approximately 5° relative to the inner surface of the riser section 20. However, this skewed configuration of the longitudinal axis A relative to the riser section 20 is subject to alteration depending upon the intended application and other design factors.

Figure 1:
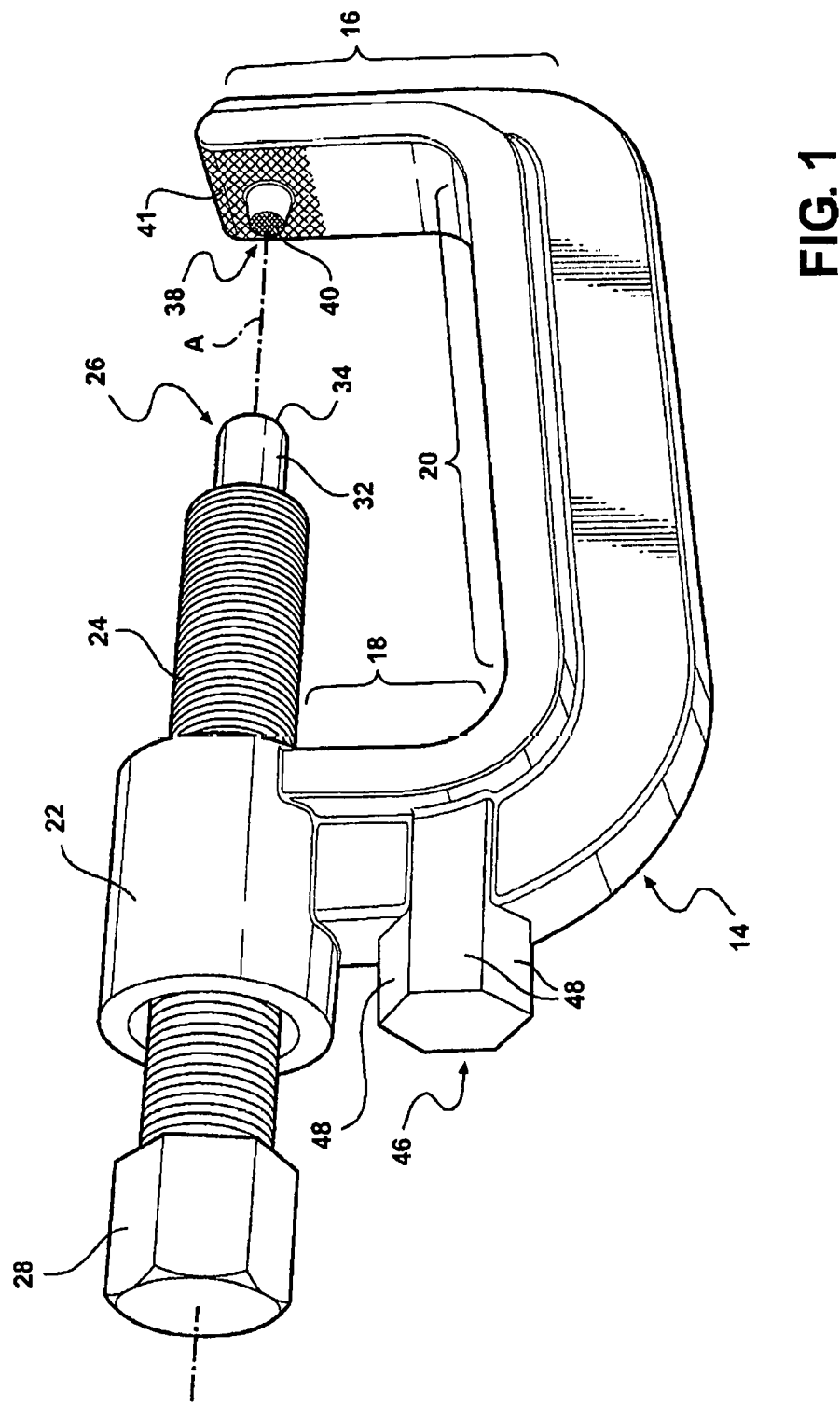
FIG. 1 is a perspective view of an unloader tool according to the subject invention.
Figure 2:
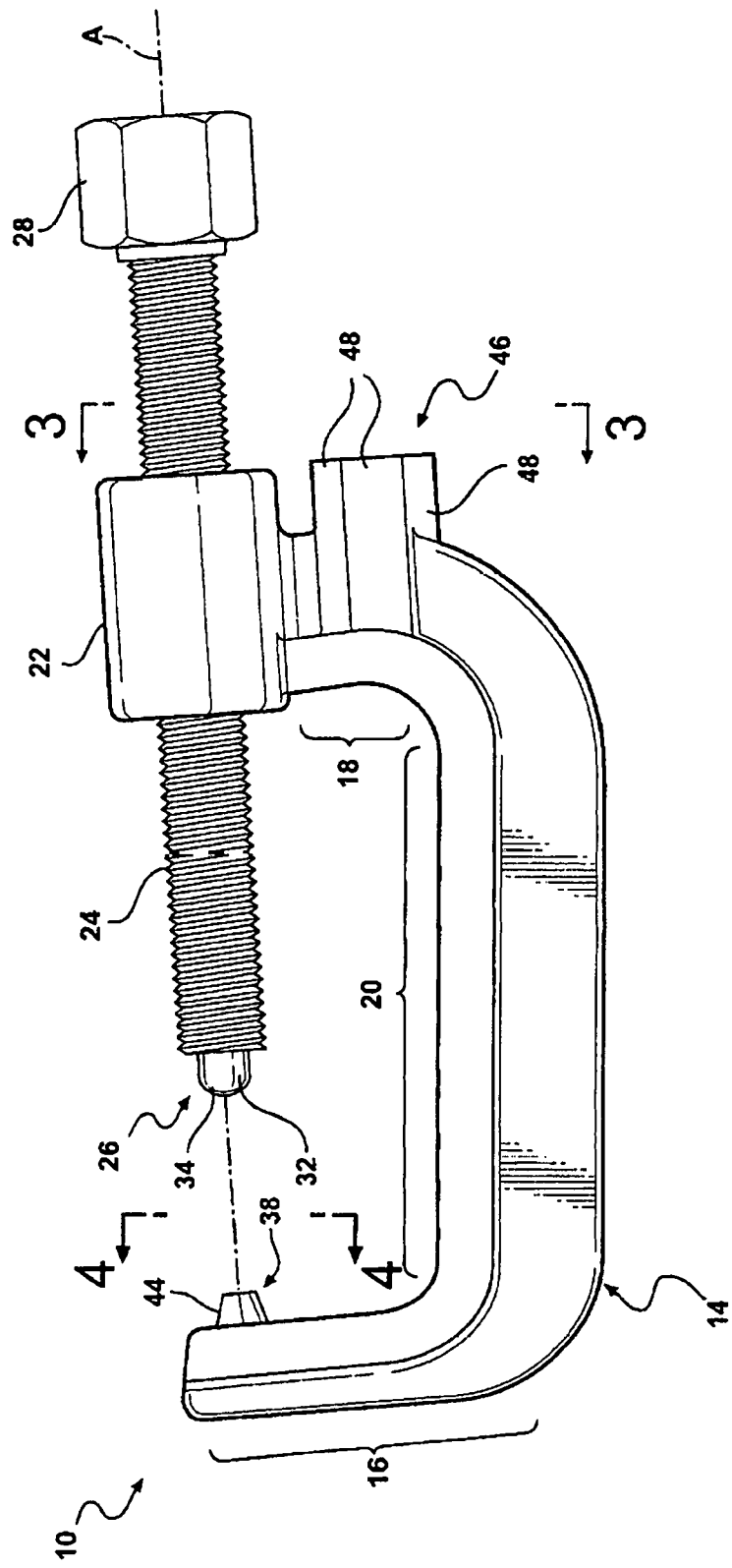
FIG. 2 is a front elevation view of the subject unloader tool.
Figure 3:
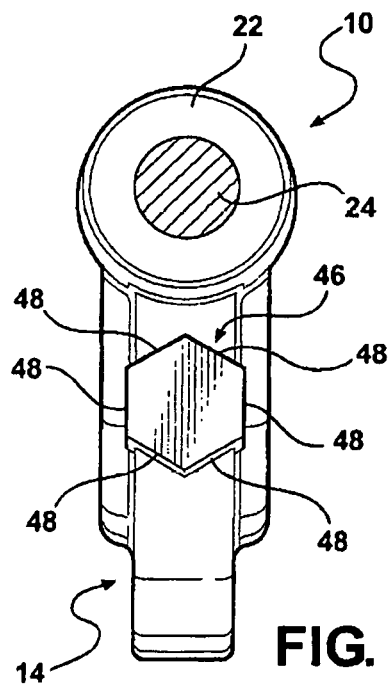
FIG. 3 is a view of the unloader tool taken generally along lines 3-3 of FIG. 2.
Figure 9:
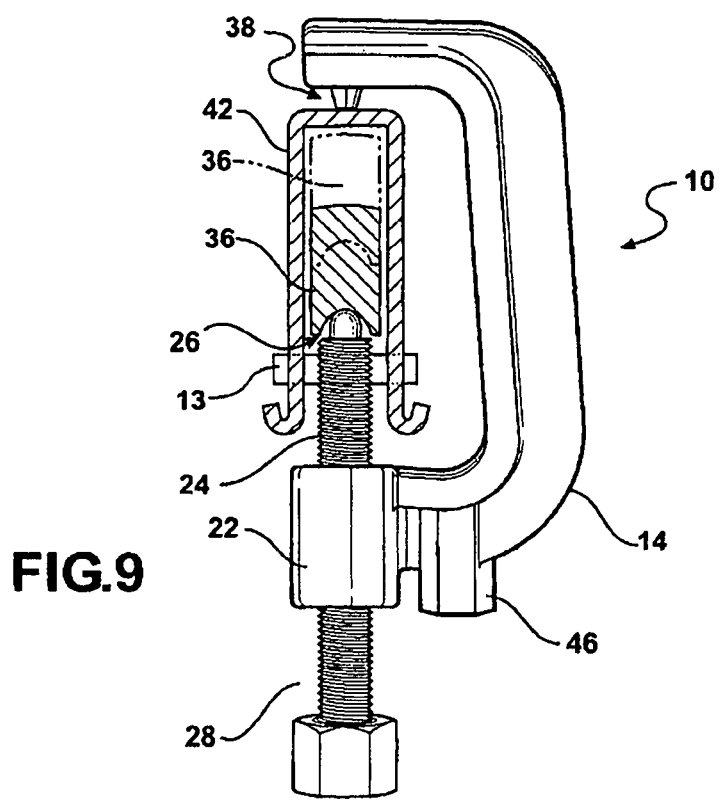
FIG. 9 is a cross-sectional view taken generally along lines 9-9 in FIG. 7.

A screw shaft 24 is threadably engaged in the boss 22 as shown in the Figures. The screw shaft 24 has a leading end and a trailing end. An anvil, generally indicated at 26, is formed at the leading end of the screw shaft 24 in an orientation that generally opposes the upper section 16 of the tool body 14. A wrench receiving portion 28 is located at the trailing end of the screw shaft 24. Preferably, the wrench receiving portion 28 comprises a hex fitting, a square end fitting, or other feature having opposed flat faces so that a common wrench 30, like that shown in FIG. 8, can apply a forceful twisting motion to the screw shaft 24. The anvil 26 at the leading end of the screw shaft 24 is perhaps best shown in FIGS. 1, 2 and 9 comprising a generally cylindrical trunk 32 capped by a hemispherical tip 34. The trunk 32 has a diameter that is substantially smaller than the major diameter of the screw shaft 24. Many adjusting arms 36, like those shown in FIGS. 7-9, are fitted with a small dimple or indentation adapted to receive the anvil 26 and help retain the leading end of the screw shaft 24 in position against the adjusting arm 36 as it is raised and lowered to load and unload spring energy from the torsion bar 11 in a controlled manner. Preferably, the anvil 26 is hardened in an appropriate metallurgical process to resist wear.

Figure 4:
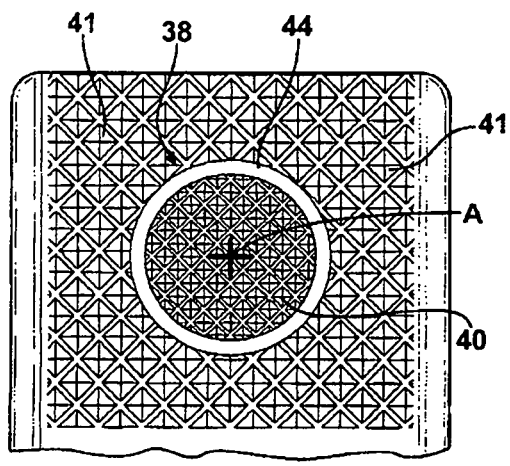
FIG. 4 is an enlarged view of the anti-rotation stem as taken along lines 4-4 in FIG. 2.
Figure 5:
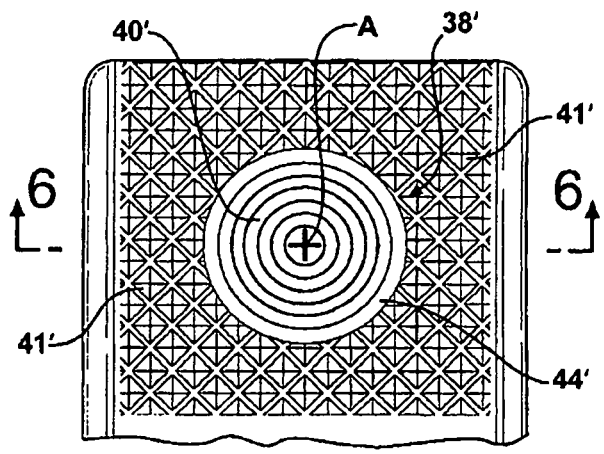
FIG. 5 is a view as in FIG. 4, but showing an alternative knurl pattern applied to the face of the anti-rotation stem.
Figure 6:
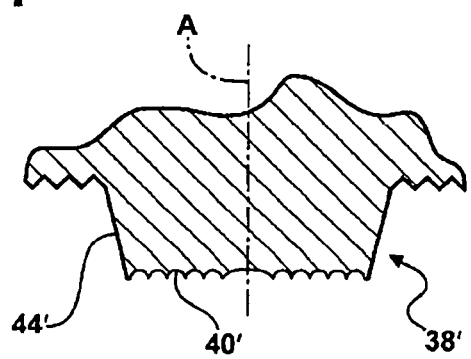
FIG. 6 is a cross-sectional view as taken generally along lines 6-6 of FIG. 5.

The upper section 16 of the tool body 14 is roughened to resist slippage. In one embodiment, an anti-slip stem, generally indicated at 38, protrudes from the inside surface of the upper section 16. The anti-slip stem 38 either directly or approximately opposes the anvil 26 of the screw shaft 24. In other words, the longitudinal axis A which is common with the screw shaft 24 preferably intersects the anti-slip stem 38 so that pressure applied by contact between the anvil 26 and the adjusting arm 36 lies in a vector passing through the anti-slip stem 38. The anti-slip stem 38 includes a flat knurled face 40 configured to prevent slippage during use of the tool assembly 10. The face 40 preferably lies in a plane normal to the longitudinal axis A. The knurled face 40 is perhaps best shown in FIG. 4 comprising a criss-crossing pattern of hardened ridges. These ridges will bite into the surface of a frame rail 42 as shown in FIGS. 7-9. FIGS. 5 and 6 depict an alternative configuration for the knurled face 40' wherein the knurling includes a plurality of concentrically oriented ridges. Those of skill will envision other possible configurations for the knurled face 40, 40' which may be effective to achieve similar functionality.

Preferably the anti-slip stem 38 is provided with a tapering sidewall 44 truncated by the generally flat knurled face 40. In other words, while the knurled face 40, 40' is roughened by the criss-crossing, concentric ridges, or the like, it is nevertheless flat in that it truncates the tapering sidewall 44, which in the preferred embodiment, achieves a generally frustoconical shape. The size of the sidewall 44, 44' is dimensioned to fit in a small pilot hole formed in the frame rail 42 common in some motor vehicle makes. Thus, in vehicles equipped with a pilot hole in the frame rail 42, which may include trucks manufactured by General Motors Corporation, the anti-slip stem 38 will register in the pilot hole and thereby help prevent the tool assembly 10 from slipping out of position during use. However, in motor vehicles not equipped with a pilot hole in the frame rail 42, the knurled face 40 will bite into the frame rail 42, thereby providing adequate purchase and resistance to tool 10 slippage during use.

The tool body 14 may include a roughened surface 41 on the inside surface of the upper section 16. This roughened surface 41 may either be applied as a supplement to the anti-slip stem 38 as shown, or used in lieu of the anti-slip stem 38. The roughened surface 41 is shown as a cut pattern of crossing grooves but could alternatively be a series of ridges, sprayed thermal coating, or other of the various known techniques.

The tool body 14 may include a counter-torque tool perch, generally indicated at 46, extending from its lower section 18 and laterally offset from the boss 22. The tool perch 46 includes at least two, but preferably six, flat faces 48 arranged to receive a standard sized open wrenching device 50 as shown in FIG. 8. Thus, in the preferred embodiment of this invention, the tool perch 46 has a generally hexagonal cross-section and may be oriented generally parallel to the longitudinal axis A. An imaginary axis extending along the length of the tool perch 46 would, in the preferred embodiment, be parallel to the longitudinal axis A. This is perhaps best illustrated in FIG. 2. The tool perch 46 is particularly effective in applying a counter-rotational torque to the tool body 14 during use of the assembly 10. The tool perch 46 increases operator safety by providing a convenient, tool receiving location at which to counteract torsional forces which might otherwise be applied to the tool assembly 10 by the primary wrench 30 turning the screw shaft 24. By laterally offsetting all of the faces 48 of the tool perch 46 away from the boss 22, clearance for a box-end or socket-type wrench 50 is provided, along with additional operator control is provided over the tool assembly 10. In other words, additional moments can be created by the two wrenches 30, 50 when applied to the tool assembly 10 which, in the hands of a skilled service technician, will permit a highly advanced ability to finesse the tool assembly 10 during difficult and hard-to-reach service procedures. Furthermore, the space between the tool perch 46 and boss 22 enables the secondary wrench 50 to be of the box-end type (shown) or socket-type, in addition to open-end type wrenches. Box-end and socket-type wrenches are preferred, however, because they are less likely to slip off the tool perch 46 during use, thereby enhancing user safety. Along these same lines, another inherent benefit is gained by laterally offsetting the tool perch 46. The standard box-end wrench 50 has a handle that is canted about 15° from the encircling socket portion. This canted handle provides greater hand clearance below the frame rail 42. Thus, without sacrificing tool purchase, the offset tool perch 46 further contributes to user safety.

Referring now to FIGS. 7-9, a method for disabling an adjusting bolt 12 from a torsion bar suspension system in a motor vehicle will be described in greater detail. The tool assembly 10 is positioned over a hollow frame rail 42 open along its bottom as shown, so that the anti-slip stem 38 either engages a pilot hole formed in the top of the frame rail 42 (some models) or finds purchase against a suitable surface. The screw shaft 24 is then tightened by turning a wrench 30 engaged with the wrench receiving portion 28 until the anvil 26 seats into the small dimple or pocket formed in the underside of the adjusting arm 36. A counter-rotational torque is simultaneously applied by a secondary, preferably box-end or socket-type wrench 50 fitted to the tool perch 46. Continued tightening of the screw shaft 26 will cause the adjusting arm 36 to push away from the adjusting bolt 12, thereby transferring all of the stress and compression forces from the stored spring energy into the tool assembly 10. This effectively un-stresses the adjusting bolt 12 and allows it to be removed or disabled. With the adjusting bolt 12 disabled, its associated cross-nut 13 can be removed from the frame rail 42, thus unblocking the channel-like interior of the frame rail 42 so that the adjusting arm 36 is free to swing a wide arc. The screw shaft 24 is then retracted, allowing the torsion bar suspension system to unload its stored energy in a safe, controlled manner. This causes the tip of the adjusting arm 36 to rotate out of the hollow frame rail 42. The tool assembly 10 is then removed and any required service operation is performed by a qualified technician.

After servicing the torsion bar suspension system, the tool assembly 10 is reattached to the frame rail 42 and the screw shaft 24 tightened against the torsion bar adjusting arm 36 to reload or restore energy back into the torsion bar suspension system. With spring energy in the suspension system reloaded, the cross-nut 13 and adjusting bolt 12 are reinstalled and poised to return to active service in engagement with the adjusting arm 36. At this stage, the service technician carefully backs out the screw shaft 24, allowing spring energy to be transferred back to the adjusting bolt 12 and cross-nut 13. When this transfer of load is complete, the tool assembly 10 is removed.

A particular advantage of the subject method allows a service technician to apply a counter-torque to the tool body 14 with a box-end or socket-type wrench 50 simultaneously with the step of transferring stress from the adjusting bolt 12 to the tool assembly 10 so as to prevent the tool assembly 10 from slipping out of position. This is done in a manner which improves safety for the service technician and enables a greater degree of control by centering the counter-torque at a location which is laterally offset from the screw shaft 24.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly, the scope of legal protection afforded this invention can only be determined by studying the following claims.

What is claimed is:

1. A method for disabling an adjusting member in a torsion bar suspension system in a motor vehicle, said method comprising the steps of:

providing the torsion bar suspension system having a loaded torsion bar, an adjusting arm affixed to one end of the torsion bar and sheltered within a hollow frame rail, with an adjusting member operatively disposed between the adjusting arm and the frame rail;

providing an unloader tool having a body with an upper section and a lower section, and a screw shaft threaded through the lower section;

positioning the upper section of the tool body over the frame rail; locating the screw shaft of the unloader tool against the adjusting arm; transferring spring energy away from the adjusting member to the unloader tool by turning the screw shaft relative to the body so that the screw shaft pushes the adjusting arm away from the adjusting member;

and applying a counter-torque to the body of the unloader tool simultaneously with said step of transferring spring energy away from the adjusting member to the unloader tool wherein the step of applying the counter-torque includes centering the counter-torque at a location laterally offset from the screw shaft.

2. The method of claim 1, wherein said step of centering the counter-torque at a location laterally offset from the screw shaft includes engaging a wrench with a counter-torque tool perch having at least two flat faces.

3. The method of claim 1, wherein said step of positioning the upper section of the tool body over the frame rail includes placing a roughened surface against the frame rail.

4. The method of claim 3 wherein the roughened surface is a cut pattern of crossing grooves.

* * * * *